United States Patent
Housman

[11] 3,641,499
[45] Feb. 8, 1972

[54] CARD AND VERIFICATION SYSTEM HAVING CARD VOIDING ELEMENT

[72] Inventor: William A. Housman, 1626 N. 190th, Seattle, Wash. 98133

[22] Filed: Dec. 22, 1969

[21] Appl. No.: 887,291

[52] U.S. Cl. ............................................340/149, 235/61.7
[51] Int. Cl. ...............................................H04q 3/00
[58] Field of Search ..........................340/149 A; 235/61.7 B

[56] References Cited

UNITED STATES PATENTS

| | | | |
|---|---|---|---|
| 2,817,824 | 12/1957 | Albright | 235/61.7 B |
| 3,299,298 | 1/1967 | Schinner | 340/149 A |
| 3,401,830 | 9/1968 | Mathews | 235/61.7 B |
| 3,443,069 | 5/1969 | Bjorn | 340/149 A |
| 3,470,359 | 9/1969 | Esterly | 340/149 A |
| 3,353,006 | 11/1967 | Pollock | 340/149 A |

*Primary Examiner*—Harold I. Pitts
*Attorney*—Seed, Berry & Dowrey

[57] ABSTRACT

A card is coded with preselected partially completed circuits including selectively positioned insulators, a card reader is coded with second partially completed circuits and a plurality of manually operated contacts which are actuated in an array known only to the owner of the card, a mismatch completes the network through the card reader and the card and energizes a fuse device within the card to void the card. A coded circuit in the card corresponds to the stored amount of credit and an electrical network in the machine is operable by contacts corresponding to the amount of stored credit to complete a circuit to the fuse of the device to void the card when the credit is used up.

8 Claims, 7 Drawing Figures 3,641,499

WILLIAM A. HOUSMAN
INVENTOR.

BY

ATTORNEYS

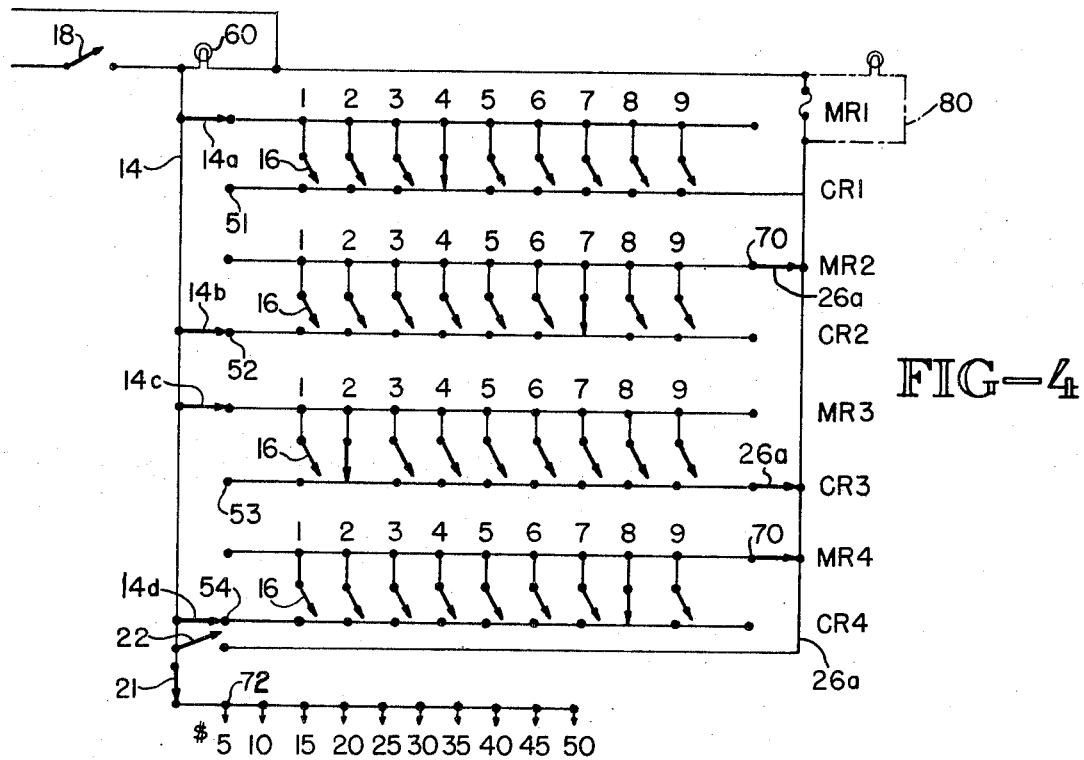
FIG-4
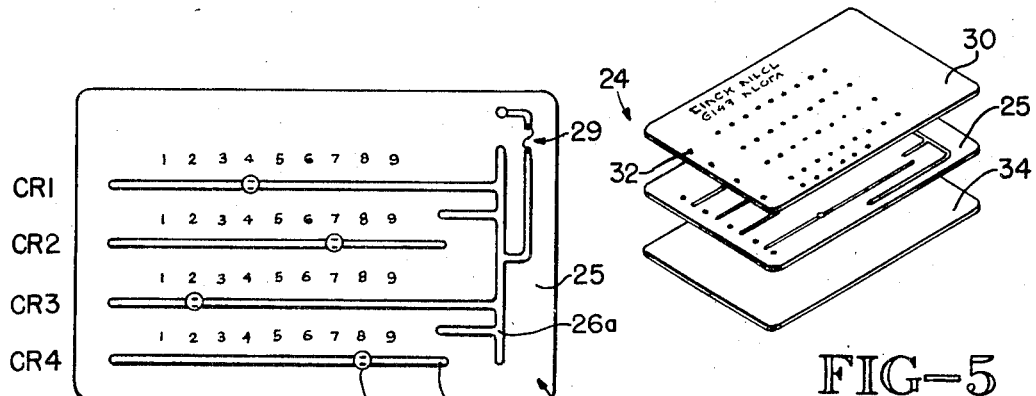
FIG-6
FIG-5
FIG-7
WILLIAM A. HOUSMAN
INVENTOR.
BY
Seed, Berry & Downey
ATTORNEYS

CARD AND VERIFICATION SYSTEM HAVING CARD VOIDING ELEMENT

BACKGROUND OF THE INVENTION

1. Field of the Invention

This invention relates to identification or credit cards and to methods and apparatus for verification of the owner of the card. The invention also relates to credit accumulating systems for credit cards.

2. Description of the Prior Art

It is well known that identification or credit cards are often stolen or lost to the effect that they come into the hands of unauthorized users. One technique for verification of the card is to compare the card number or owner's name with a periodically circulated and updated list of cancelled cards. A second technique is to telephone and compare the number or owner's name with a computerized list of cancelled cards. Both of these techniques are costly and time consuming substantially reducing the usefulness of the card.

Various techniques have also been developed for verification of the card by giving the owner a code number or combination of letters and numbers which is known only by the owner or authorized user. The numerical code is then compared with the code in the card at the time of use. The techniques heretofore employed however have required expensive equipment and electronic circuitry to provide an effective system. One such technique requires the use of a separate validation token as well as a sensitive electronic comparator circuit.

Known credit cards have also been deficient in providing a simple, inexpensive, credit accumulating means in a card. Systems heretofore used, for example, have employed magnetic accumulation systems requiring complicated and expensive equipment for accumulating the credit and comparing it with the credit stored in the card.

SUMMARY OF THE INVENTION

An object of this invention is to provide an inexpensive simple to operate and maintain, verification system for information cards, such as identification and credit cards.

Another object is to provide a card having precoded partially completed electrical circuits and a card reader having partially completed electrical circuits that are matched by switches arranged in a memorized coded array.

Another object is to provide a card verification system in which the card includes an internal voiding device when the improper code is placed into the system.

Another object is to provide a credit storage and accumulation system in a credit card which voids the card by electrically completing circuits to a signaling device.

Another object is to provide a verification system wherein insulators are positioned on conductors in a card in a coded array and a memorized code is placed in a card reader having energized circuits in such a manner that no circuit is complete if the codes match.

Another object is to provide a method of card verification which includes encoding a card and a card reader, matching the codes, and signaling the units of the matching.

In general these objects are accomplished by the use of a card having partially completed electrical circuits formed of an array of conductors and insulators positioned on the conductors, a card reader having electrical input and output, an array of conductors in the card reader connected to the insulators or conductors of the card according to a memorized code and contacts for coupling the card reader conductors to the input and output for completing the circuit, and means for signaling the results of the match between the various contacts, insulators and conductors. In the preferred form completion of a circuit indicates an improper code and a voiding of the card by a self-destruct or fuse device within the card. Accumulative credit means are also embodied into one form of the card.

BRIEF DESCRIPTION OF THE DRAWINGS

FIG. 4 is a schematic circuit diagram illustrating the connections between the input to the conductors in the card reader and card for a card and card reader coded with the code A4728.

FIG. 5 is an exploded schematic of a card showing the partially completed circuits.

FIG. 6 is a plan of the center laminate of the type shown in FIG. 5 with partially completed circuits coded for the A4728 code.

FIG. 7 is a plan of the center laminate of the card shown in FIG. 5 with partially completed circuits coded for code B2843.

DESCRIPTION OF THE PREFERRED EMBODIMENTS

Figure 1:
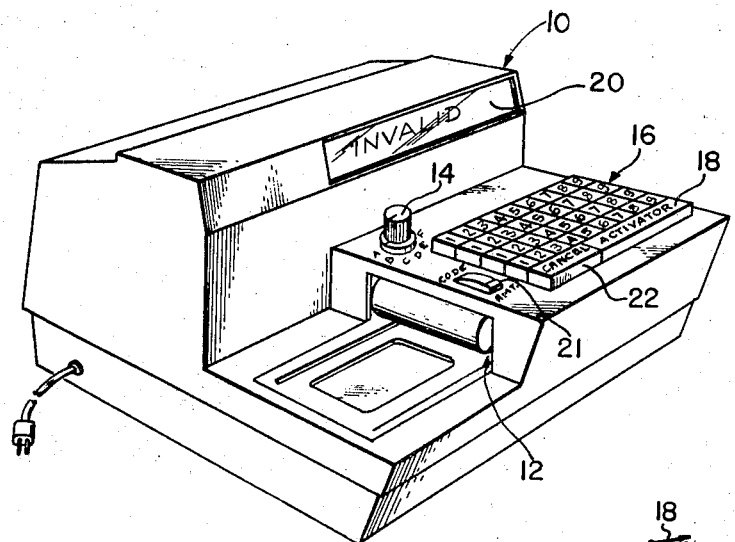
FIG. 1 is a perspective view of a card reader embodying the principles of the invention.

In general, the card reader is indicated by the numeral 10 and includes a card-receiving slot and reciprocating carrier 12, a selector switch 14, and code switches 16. An activator switch 18 is provided to connect an electrical input to the card reader, preferably after a card has been inserted into the card reader and the selector switch and code switches have been actuated. In some forms of the invention an "invalid" signal panel 20 may be shown on the card reader and/or an accumulative credit switch 21 and/or a cancel switch 22 may also be provided. The card reader will be located at a convenient location in the retailer's facility and will be connected to a conventional source of electricity.

In some forms of the invention the carrier 12 is powered to automatically reciprocate by actuation of the activator switch 18. In other forms the carrier is manually reciprocated. In either form the bill or the like will be pushed against the card and the identification indicia on the card will be transferred to the bill by conventional printing apparatus. Since the bill recording operation and verification take place simultaneously a savings in time is accomplished and the verification is carried out with no inconvenience to the customer.

A card 14 is shown in FIGS. 5, 6 and 7 and includes a center laminate 25 having a printed circuit or other type conventional electrical conductors 26, a plurality of insulators 28 positioned at various locations along the conductors, and in the preferred form an internal fuse device 29 which will indicate a voided card by burning by any well known means an area of the card visible to the user. An upper laminate 30 which may be embossed and otherwise provided with customary identification indicia, includes a plurality of connectors 32 which extend down into electrical contact with the conductors 26 of the card. A bottom laminate 34, which may also contain customary information, may in the alternative be provided with the connectors for contacting the conductors 26. In some forms it may even be desirable to put connectors on both the top and bottom laminates depending upon the location of the various switch contacts in the card reader which introduce an electrical input to the card in a manner to be described. As a further modification the connections to the conductors could be designed into the top or bottom laminates merely by the use of a conductive plastic which is indistinguishable from the plastic of which the card laminates are made. For example holes punched in the upper laminate of the card could be filled with electrically conductive plastic to conduct between the contacts in the card reader and the conductors in the center laminate.

Figure 2:
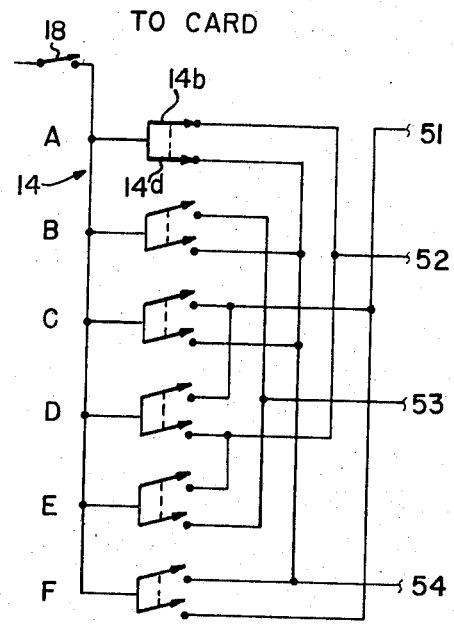
FIG. 2 is a schematic circuit diagram illustrating connections in the card reader between an electrical input and contacts which connect to conductors in the card.
Figure 3:
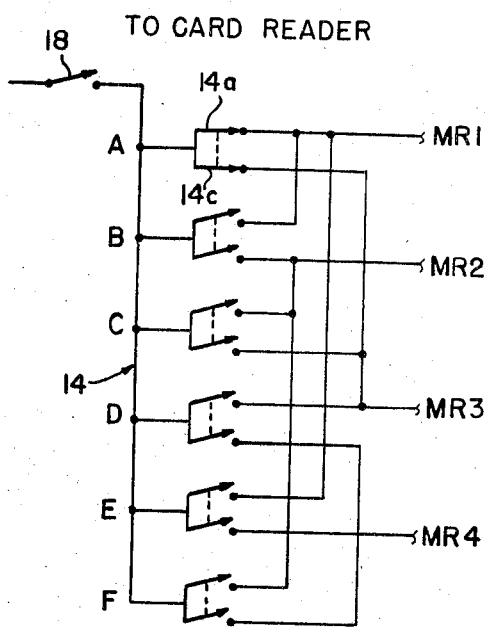
FIG. 3 is a schematic circuit diagram illustrating connections in the card reader between an electrical input and contacts which connect to conductors in the card reader.

The internal connections within the card reader 10 for providing the verification system circuits are best shown in FIGS. 2, 3 and 4. In FIG. 2 the selector switch 14 is schematically indicated as having six different settings A–F and may be of any conventional form such as a rotary switch. The number of settings may also be varied depending upon the number of code arrangements desired. In FIG. 2 the setting for a code beginning with the letter "A" is shown with the switch contacts 14b and 14d coupling the input from switch 18, in parallel with an indicator lamp 60, to spring biased contacts 52 and 54. Contacts 52 and 54 form part of a series of four such contacts. 51–54 which are biased downwardly in a conventional manner to engage the connectors 32 which in turn connect with the conductors 26 on a card. For the purpose of this description conductors 26 on the card are numbered CR1–CR4 and correspond and connect respectively with contacts 51–54 each time a card is placed in the card reader 10. It is thus seen that with the selector switch set for position or code "A" that conductors CR2 and CR4 are connected to the electrical input when activator switch 18 is closed.

Selector switch 14 also has sets of contacts 14a and 14c which as shown in FIG. 3 connect with conductors in the card reader numbered MR1–MR4. The selector switch 14 is set for code "A" in FIG. 3 such that contacts 14a and 14c are closed to card reader conductors MR1 and MR3. Thus conductors MR1 and MR3 are connected to the electrical input when activator switch 18 is closed.

OPERATION

FIG. 4 shows schematically a completed verification system with a card having rows CR1–CR4 inserted in the card reader. The card reader selector switch 14 is set for code "A," the code switches 16 are set for 4728, and the card is coded for a complete code A4728 which is known only the the authorized user. The user's code is applied to the card reader by moving the selector switch to position "A" such that contacts 14a and 14c connect with card reader conductors MR1 and MR3. Contacts 14b and 14d of the selector switch connect to card conductors CR2 and CR4 via spring biased contacts 52 and 54. Next the code switches 16 corresponding to the user's numbers "4728" are depressed, one number for each card reader row. The properly coded card 24 will, of course, contain insulators 28 at positions corresponding to the code switches depressed. In other words switch 16 for code number "4" will engage a connector 32 which contacts the insulator on the card conductor CR1, switch 16 for code number "7" will engage a connector 32 which contacts the insulator on the card row CR2, and so on. In each case where a code switch 16 will connect a connector 32 which in turn is in contact with an insulator 28, an open circuit results. In the preferred form of the invention an open circuit will not void a card. Card conductors CR1 and CR3 are connected directly to the fuse device circuit by a portion 26a of the card conductors 26. Card conductors CR2 and CR4 are connected to selector switch 14, however, they are not connected to the fuse device and thus an open circuit again will exist. Card reader conductors MR1 and MR3 although connected to selector switch 14 are not connected to the fuse device circuit since card portion 26a does not extend laterally to the left at the positions which would connect with card reader conductors MR1 and MR3. Card reader conductors MR2 and MR4 do connect to the card fuse circuit via contacts 70, connectors 32, and card conductor portions 26a which extend to the left, as shown for example in the card of FIG. 6. When the card bearing code "A4728" is placed in the card reader, properly set for this code, and activator switch 18 is closed not one of the paths through card reader conductors MR1–MR4 nor card conductors CR1–CR4 are completed to the fuse device. If any variation from the proper code occurs, as for example when an unauthorized user attempts to use an erroneous code, a complete circuit will be established through the fuse device thus voiding the card. For example, if the erroneous code B4728 is used in the card reader the selector switch contacts 14 for the "B" setting will be closed and a circuit will be complete through selector switch contacts 14c, the card reader conductor MR2, the portion 26a of the card conductor 26, the fuse device 29, and through the second line of the input cable. If the correct "A" setting is used but an erroneous code number, such as "5728," is used then a circuit will be complete between contacts 14a of the selector switch, card machine conductor MR1, code switch 16, card conductor CR1, portion 26a of card conductor 26, fuse device 29, to the second conductor of the input cable, thus voiding the card.

In FIG. 4 an optional cancel switch 22 is shown which may be closed at any time by the operator of the retail establishment to void the card by completing a circuit to the fuse device. Also shown is an accumulating credit device which is also optional. In the accumulating credit feature a slidable switch or a series of depressable switches 72 is mounted on the face of the card reader. Each switch or space between slide increments would be marked with a set amount of credit. When a credit transaction is made the switch corresponding to that amount would be closed testing the card to see if sufficient credit is available and also defacing the face of the card to indicate the amount of the transaction. The next credit transaction would take place further to the right of the defaced amount until a switch 72 closed on a portion 26b. Portion 26b shown in FIG. 7 embodies the accumulative credit feature and extends to the left to connect to the portion 26a of conductor 26 to complete the circuit to the fuse device or to an external signal when a card fuse device is not used. As shown conductor 26b is set for $40.00 credit. When switch 72 corresponding to $40.00 is depressed, a signal is sounded or shown by a circuit through card conductor 26b, portion 26a to a signal circuit 80.

The card shown in FIG. 7 also shows a second code for purposes of explanation. This card is set for the code "B2843." The card shown does not employ an internal fuse device but rather the portion 26a is connected to a bell or light circuit 80 in the card reader as shown in phantom in FIG. 4.

While the preferred form and certain modified forms of the invention have been described it should be understood that various other modifications will be apparent to one skilled in the art while still embodying the principles of the invention. Accordingly, the scope of the invention is to be limited only by a proper interpretation of the claims appended hereto.

The embodiments of the invention in which a particular property or privilege is claimed are defined as follows:

1. A verification system for an information card having a plurality of continuous and discontinuous concealed conductors arranged in the card according to a predetermined code pattern, a card-voiding element forming a part of one of said conductors, a card reader having a source of electrical power operable to energize said card-voiding element to void a card, and means in said card reader for comparing a memorized code with the code pattern of conductors in the card and for coupling said power source to said conductor having said card-voiding element when the codes do not match thereby voiding the card.

2. The verification system of claim 1 said comparing means including switch means having a plurality of contacts engageable with various ones of said continuous and discontinuous card conductors.

3. The verification system of claim 2 said continuous and discontinuous card conductors extending across said card, a plurality of second switch means spaced along said conductors and having contacts overlying the conductors, and a plurality of insulators interposed between the conductors and the contacts of said second switch means and arranged according to said coded pattern whereby said contacts will engage the insulators when actuated in accordance with the coded pattern so as not to cause energization of said card-voiding element.

4. The verification system of claim 3 further including means for storing a predetermined amount of credit in the card.

5. A verification system for an information card comprising a card having a plurality of conductors, a card reader including switch means having a plurality of spaced manually operated contacts overlying said conductors in the card and being operable upon engagement with said conductors to void the card, and a plurality of insulators interposed between the contacts and the card conductors and arranged according to a coded pattern whereby moving the contacts in accordance with the coded pattern into engagement with the insulators will not void the card.

6. The verification system of claim 5 said card conductors being continuous and discontinuous and arranged according to said coded pattern, and second switch means having contacts operable upon engaging a continuous conductor to void the card.

7. The verification system of claim 6 including a card-voiding element in one of the conductors of said card and being operable to indicate that a mismatch has occurred and void the card.

8. The verification system of claim 4 further including means for storing a predetermined amount of credit in the card.

* * * * *